US009860441B1

(12) United States Patent
Barron et al.

(10) Patent No.: US 9,860,441 B1
(45) Date of Patent: *Jan. 2, 2018

(54) TILE-BASED DIGITAL IMAGE CORRESPONDENCE

(71) Applicant: Google Inc., Mountain View, CA (US)

(72) Inventors: Jonathan T. Barron, Mountain View, CA (US); Dillon Sharlet, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,532

(22) Filed: Jul. 12, 2017

Related U.S. Application Data

(63) Continuation of application No. 14/720,748, filed on May 23, 2015, now Pat. No. 9,736,366.

(51) Int. Cl.
| | |
|---|---|
| *H04N 5/228* | (2006.01) |
| *H04N 5/235* | (2006.01) |
| *H04N 5/232* | (2006.01) |
| *G06K 9/46* | (2006.01) |
| *G06T 5/00* | (2006.01) |

(52) U.S. Cl.
CPC ........... *H04N 5/23232* (2013.01); *G06K 9/46* (2013.01); *G06K 9/4604* (2013.01); *G06T 5/00* (2013.01); *G06K 2009/4666* (2013.01)

(58) Field of Classification Search
CPC .......... G06T 3/4038; G06K 2009/2045; H04N 5/23248; H04N 5/23258; H04N 5/23254; H04N 5/23267; H04N 5/23287
See application file for complete search history.

(56) References Cited

U.S. PATENT DOCUMENTS

| | | | |
|---|---|---|---|
| 5,729,691 | A | 3/1998 | Agarwal |
| 5,986,668 | A | 11/1999 | Szeliski et al. |
| 5,987,164 | A | 11/1999 | Szeliski et al. |
| 6,009,190 | A | 12/1999 | Szeliski et al. |

(Continued)

OTHER PUBLICATIONS

Adams et al., "Fast High-Dimensional Filtering Using the Permutohedral Lattice," Eurographics, 2010, pp. 753-762, vol. 29, No. 2.

(Continued)

*Primary Examiner* — Sinh Tran
*Assistant Examiner* — Selam Gebriel
(74) *Attorney, Agent, or Firm* — McDonnell Boehnen Hulbert & Berghoff LLP

(57) ABSTRACT

A computing device may obtain a first captured image of a scene and a second captured image of the scene. For a plurality of m×n pixel tiles of the first captured image, the computing device may determine respective distance matrixes. The distance matrixes may represent respective fit confidences between the m×n pixel tiles and pluralities of target p×q pixel tiles in the second captured image. The computing device may approximate the distance matrixes with respective bivariate surfaces. The computing device may upsample the bivariate surfaces to obtain respective offsets for pixels in the plurality of m×n pixel tiles. The respective offsets, when applied to pixels in the plurality of m×n pixel tiles, may cause parts of the first captured image to estimate locations in the second captured image.

20 Claims, 8 Drawing Sheets

(56) References Cited

U.S. PATENT DOCUMENTS

| | | | |
|---|---|---|---|
| 6,018,349 | A | 1/2000 | Szeliski et al. |
| 6,043,909 | A | 3/2000 | Holub |
| 6,044,181 | A | 3/2000 | Szeliski et al. |
| 6,075,905 | A | 6/2000 | Herman et al. |
| 6,097,854 | A | 8/2000 | Szeliski et al. |
| 6,157,747 | A | 12/2000 | Szeliski et al. |
| 6,411,953 | B1 | 6/2002 | Ganapathy et al. |
| 7,113,649 | B2 | 9/2006 | Gindele |
| 7,200,264 | B2 | 4/2007 | Hubel et al. |
| 8,149,459 | B2 | 4/2012 | Mestha et al. |
| 8,155,454 | B2 | 4/2012 | Raveendrawn |
| 8,179,402 | B2 | 5/2012 | Ten |
| 8,253,752 | B2 | 8/2012 | Raveendrawn |
| 8,988,536 | B2 | 3/2015 | Park et al. |
| 9,007,484 | B2 | 4/2015 | Zhang |
| 2006/0269155 | A1* | 11/2006 | Tener .................. G06T 3/4038 382/243 |
| 2010/0321539 | A1 | 12/2010 | Ito |

OTHER PUBLICATIONS

Alahi, Alexandre et al., "Freak: Fast Retina Keypoint," IEEE Conference on Computer Vision and Pattern Recognition (CVPR), 2012, pp. 510-517.
Barnard, Kobus, "Improvements to Gamut Mapping Colour Constancy Algorithms," In Computer Vision-ECCV 2000, pp. 390-403, Springer Berlin Heidelberg.
Barnard, Kobus et al., "A Comparison of Computational Color Constancy Algorithms—Part II: Experiments With Image Data," IEEE Transactions on Image Processing, 2002, pp. 985-996, vol. 11, No. 9.
Barron et al., "Fast Bilateral-Space Stereo for Synthetic Defocus," CVPR, 2015, 9 pages.
Barron, Jonathan T. et al., "Volumetric Semantic Segmentation using Pyramid Context Features," IEEE International Conference on Computer Vision (ICCV), 2013, pp. 3448-3455.
Barrow H. G. et al. "Recovering Intrinsic Scene Characteristics From Images," Computer Vision Systems, 1978, pp. 3-26, A. Hanson & E. Riseman (eds.), New York: Academic Press.
Belongie, Serge et al., "Shape Context: A new descriptor for shape matching and object recognition," In NIPS, 2000, 7 pages, vol. 2.
Berens et al., "Log-opponent chromatically coding of colour space," IEEE, 2000, pp. 206-211.
Berg, Alexander C. et al., "Geometric Blur for Template Matching," Proceedings of the 2001 IEEE Computer Society Conference on Computer Vision and Pattern Recognition, (CVPR 2001), IEEE, 2001, 8 pages, vol. 1.
Berwick et al., "A Chromaticity Space for Specularity, Illumination Color- and Illumination Pose-Invariant 3-D Object Recognition," Sixth International Conference on Computer Vision, 1998, pp. 165-170.
Bianco, Simone et al., "Color Constancy Using Faces," IEEE Conference on Computer Vision and Pattern Recognition (CVPR), IEEE, 2012, pp. 65-72.
Brainard, David H. et al., "Analysis of the retinex theory of color vision," J. Opt. Soc. Am. A, Oct. 1986, pp. 1651-1661, vol. 3, No. 10.
Buchsbaum, G., "A spatial processor model for object colour perception," Journal of the Franklin institute, 1980, pp. 1-26, vol. 310, No. 1.

Chakrabarti, Ayan, et al., "Color constancy with spatia-spectral statistics," IEEE Transactions on Pattern Analysis and Machine Intelligence, 2012, pp. 1509-1519, vol. 34, No. 8.
Chen, S. et al., "Real-time edge-aware image processing with the bilateral grid," ACM SIGGRAPH, 2007, pp. 1-9.
Cheng, Dongliang et al., "Illuminant Estimation for Color Constancy: Why spatial-domain methods work and the role of the color distribution," JOSA A, 2014, pp. 1049-1058, vol. 31, No. 5.
Esme, Biglin, "Kalman Filter for Dummies," Bilgin's Blog, Mar. 2009, 5 pages, http://bilgin.esme.org/BitsBytes/KalmanFilterforDummies.aspx.
Farbman, Zeev et al., "Convolution Pyramids," ACM Trans. Graph., 2011, pp. 1-9, vol. 30, No. 6.
Farnebäck, Gunnar, "Polynomial Expansion for Orientation and Motion Estimation," Linköping Studies in Science and Technology, Dissertations, Nov. 2002, pp. 1-182, http:://lmi.bwh.harvard.edu/papers/pdfs/gunnar/farneback02.pdf.
Finlayson, Graham D., "Corrected-Moment Illuminant Estimation," IEEE International Conference on Computer Vision (ICCV), IEEE, 2013, pp. 1904-1911.
Finlayson et al., "Shades of Gray and Colour Constancy," IS&T/SID Twelfth Color Imaging Conference, 2004, pp. 37-41.
Gastal et al., Domain transform for edge-aware image and video processing. SIGGRAPH, 2011, 11 pages.
Gaussian, "The Exponential Family of Distributions," last accessed May 26, 2015, 13 pages, http://ww.cs.columbia.edu/~jebara/4771/tutorials/lecture12.pdf.
Gehler, Peter V., et al., "Bayesian Color Constancy Revisited," IEEE Conference on Computer Vision and Pattern Recognition, CVPR 2008, IEEE, 2008, pp. 1-8.
Gijsenij, Arjan et al., "Color Constancy Using Natural Image Statistics and Scene Semantics," IEEE Transactions on Pattern Analysis and Machine Intelligence, 2011, pp. 687-698, vol. 33, No. 4.
Gijsenij, Arjan et al., "Computational Color Constancy: Survey and Experiments," IEEE Transactions on Image Processing, 2010, pp. 2475-2489, vol. 20, No. 9.
Gilchrist, Alan, Seeing Black and White, Oxford University Press, 2006, all pages.
Joze, Hamid Reza Vaezi et al., "The Role of Bright Pixels in Illumination Estimation." In Color and Imaging Conference, Society for Imaging Science and Technology, 2012, pp. 41-46, vol. 2012, No. 1.
Kalman filter, Wikipedia, http://en.wikipedia.org/wiki/Kalman_filter#Information_filter, last accessed May 26, 2015, 26 pages.
Lewis, J.P., "Fast Normalized Cross-Correlation," Expanded Version of paper from Vision Interface, 1995, 7 pages.
Rowse, Darren, "Introduction to White Balance," Digital Photography School, 2014, 5 pages.
Shi, Lilong et al., "Shi's Re-processed Version of the Gehler Color Constancy Dataset of 568 Images," Simon Fraser University (2010), http://www.cs.sfu.ca/~colour/data, 3 pages.
Taskar, Ben et al., "Learning Structured Prediction Models: A Large Margin Approach," In Proceedings of the 22nd International Conference on Machine Learning, ACM, 2005, 235 pages.
Tomasi et al., "Bilateral filtering for gray and color images," Proceedings of the 1998 IEEE International Conference on Computer Vision (ICCV) Bombay, India, 1998, 8 pages.
Van De Weijer, Joost et al., "Edge-Based Color Constancy," IEEE Transactions on Image Processing, 2007, pp. 2207-2214, vol. 16, No. 9.
Welch et al., "An Introduction to the Kalman Filter, Course 8," SIGGRAPH, 2001, pp. 1-81.

* cited by examiner

TILE-BASED DIGITAL IMAGE CORRESPONDENCE

CROSS-REFERENCE TO RELATED APPLICATION

This application is a continuation of and claims priority to U.S. patent application Ser. No. 14/720,748, filed May 23, 2015, which is hereby incorporated by reference in its entirety.

BACKGROUND

Digital imaging may refer to capturing and representing the color and brightness characteristics of scenes in digital images (e.g., photographs or motion video). When two or more digital images of a particular scene are captured, some of these digital images may be further enhanced and/or combined to create new digital images or image effects. However, before this processing takes place, it is often beneficial to align groups of digital images. In this way, the relative locations of similar features in each digital image can be taken into account.

SUMMARY

Digital imaging devices, such as wireless computing devices, digital cameras, head-mounted displays, and so on, may capture arrays of digital images of a scene. These digital images may be captured consecutively in time, perhaps a few milliseconds apart from one another. Alternatively or additionally, the digital images may be captured at approximately the same time, but with more than one image sensor. In the latter cases, for instance, a wireless computing device may include multiple individual image sensors, or multiple digital cameras may be arranged to capture digital images in a coordinated fashion.

Thus, a series of two or more digital images of a particular scene may represent temporally or spatially distinct versions of the scene. The information in these images may be used to enhance one another, or to synthesize new digital images of the scene. For instance, information in two of the digital images may merged to create an enhanced version of the scene that is sharper, or exhibits less noise, than any of the digital images in their original form. In another example, a third digital image may be interpolated from two of the captured digital images. This interpolated image may be a synthetic digital image that represents the scene at a point in time between when the two digital images were captured, or a view of the scene from a virtual camera.

Regardless of the application, synthesizing new digital images based on two or more captured digital images may involve aligning parts of the two or more digital images to one another. It is desirable for this alignment procedure to be computationally efficient so that it can operate in real-time, or near-real-time, on various types of image capture devices.

Accordingly, a first example embodiment may involve obtaining a first captured image of a scene and a second captured image of the scene. For a plurality of m×n pixel tiles of the first captured image, respective distance matrixes may be determined. The distance matrixes may represent respective fit confidences between the m×n pixel tiles and pluralities of target p×q pixel tiles in the second captured image. The first example embodiment may further involve approximating the distance matrixes with respective bivariate quadratic surfaces. The bivariate quadratic surfaces may be upsampled to obtain respective offsets for pixels in the plurality of m×n pixel tiles. The respective offsets, when applied to pixels in the plurality of m×n pixel tiles, may cause parts of the first captured image to estimate locations in the second captured image.

A second example embodiment may involve obtaining a first captured image of a scene and a second captured image of the scene. For an m×n pixel tile of the first captured image a distance matrix may be determined. The distance matrix may represent fit confidences between the m×n pixel tile and a plurality of target p×q pixel tiles in the second captured image. The second example embodiment may also involve approximating the distance matrix with a bivariate quadratic surface. The bivariate quadratic surface may be upsampled to obtain respective offsets for pixels in the m×n pixel tile. The respective offsets, when applied to pixels in the m×n pixel tile, may cause parts of the first captured image to estimate locations in the second captured image.

In a third example embodiment, an article of manufacture may include a non-transitory computer-readable medium, having stored thereon program instructions that, upon execution by a computing device, cause the computing device to perform operations in accordance with any of the first and/or second example embodiments.

In a fourth example embodiment, a computing device may include at least one processor, as well as data storage and program instructions. The program instructions may be stored in the data storage, and upon execution by the at least one processor may cause the computing device to perform operations in accordance with any of the first and/or second example embodiments.

In a fifth example embodiment, a system may include various means for carrying out each of the operations of any of the first and/or second example embodiments.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
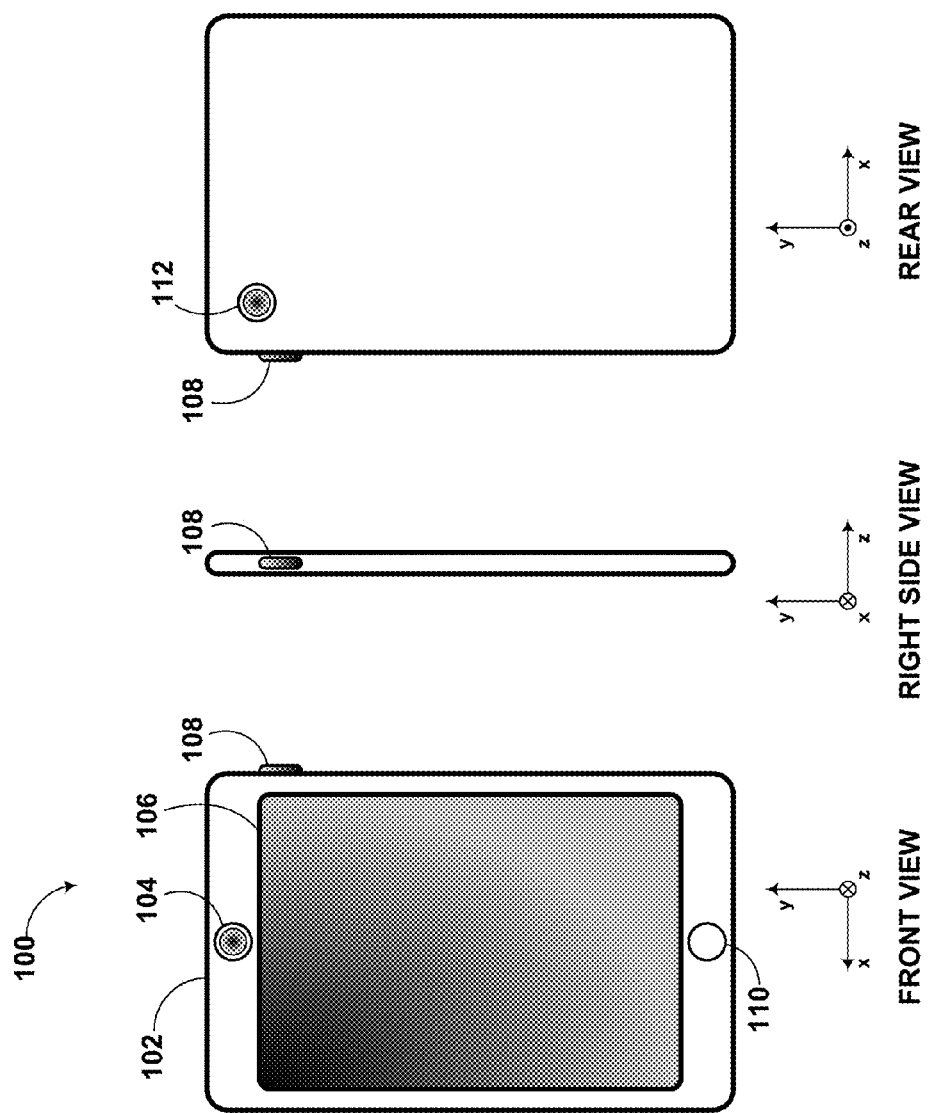
FIG. 1 depicts front, right side, and rear views of a digital camera device, according to example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Example Image Capture Devices

As image capture devices, such as cameras, become more popular, they may be employed as standalone hardware devices or integrated into various other types of devices. For instance, still and video cameras are now regularly included in wireless computing devices (e.g., mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
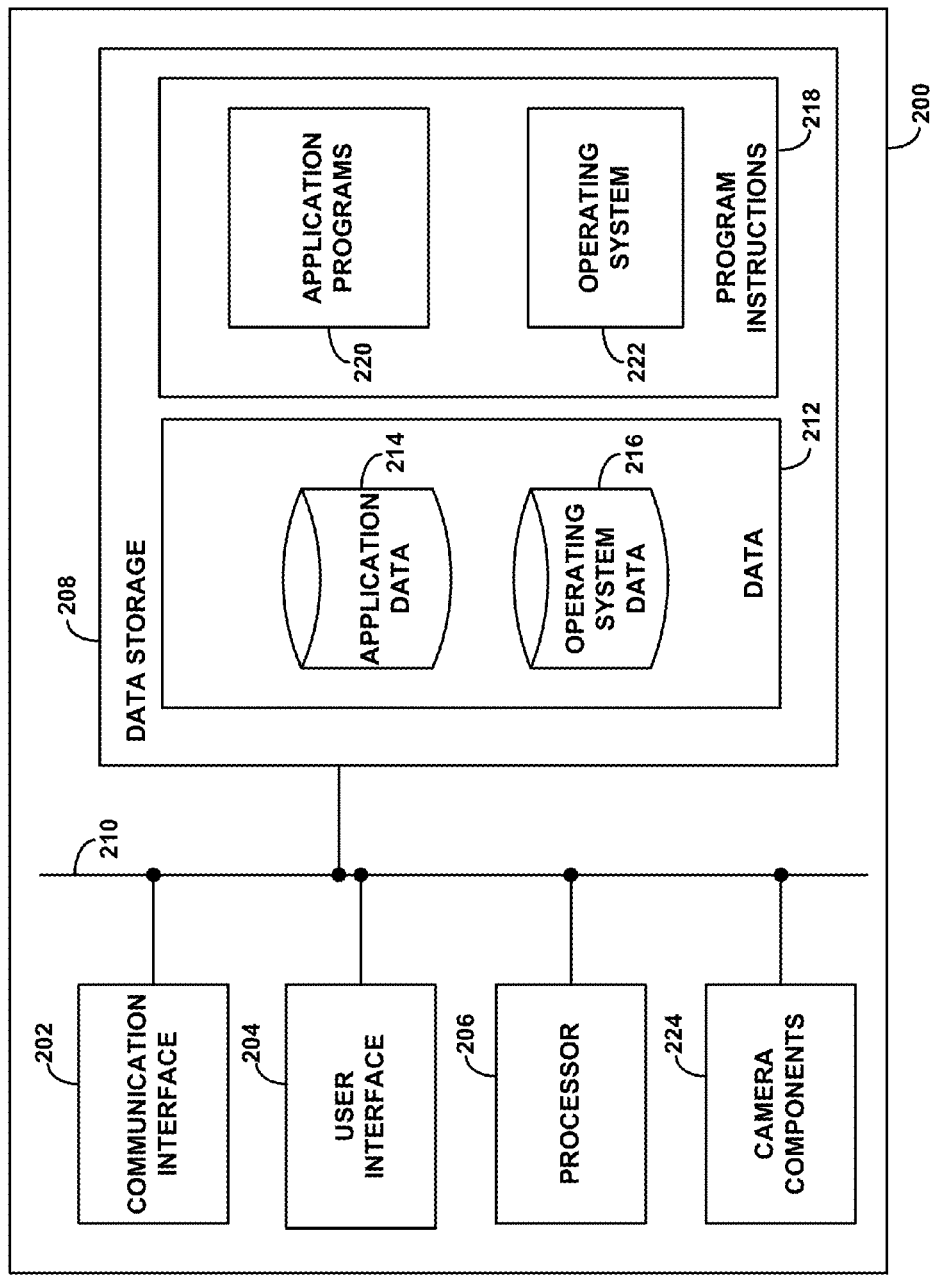
FIG. 2 depicts a block diagram of a computing device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

2. Example Image Alignment

A variety of image processing operations depend on being able to determine which pixels correspond to one another in two images. To this end, the embodiments herein provide techniques for efficiently matching patches of pixels in one image to locations in another image. A "patch" of pixels may refer to a group of one or more pixels from the same general location in an image. Naïve approaches to solving this problem are prohibitively expensive in terms of computation. But, the embodiments herein are efficient and fast, capable of processing high-resolution images (e.g., 15 megapixels or more) in less than a second.

Given the determined patch-to-location matches in the two images, a new image filtering technique, in some cases based on Kalman filtering, can produce accurate per-pixel motion and matching estimates. This matching procedure can be used for a variety of purposes, such as motion estimation and for merging multiple images.

Figure 3:
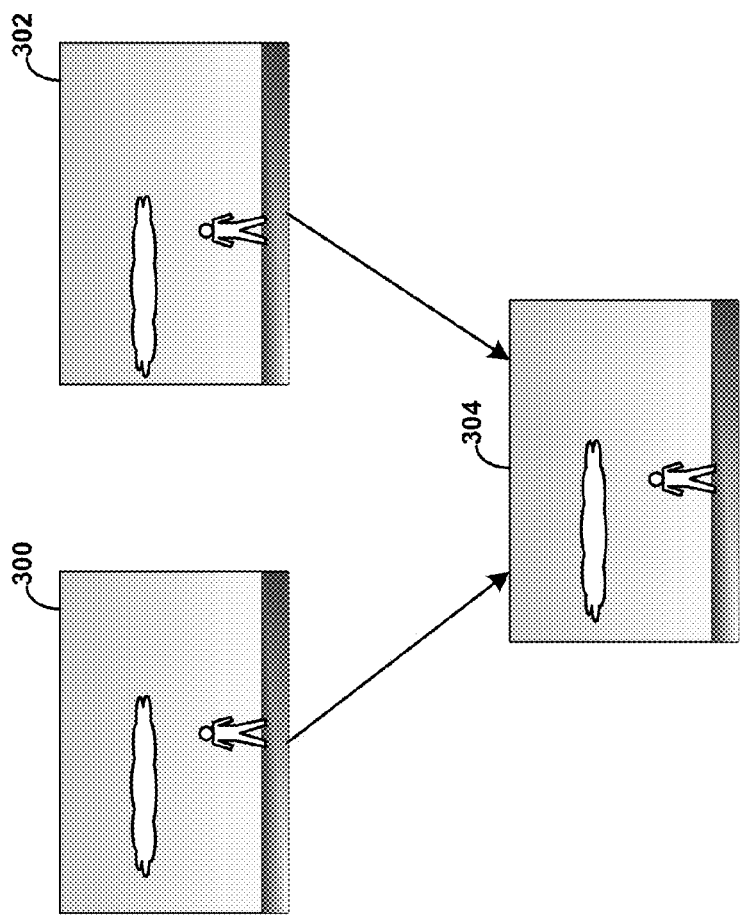
FIG. 3 depicts processing of captured images, according to example embodiments.

FIG. 3 includes example captured images 300 and 302. Both of these images depict a landscape containing a person and a cloud. In captured image 302, the person and the cloud are both slightly to the left of where they are in captured image 300. Therefore, captured images 300 and 302 may have been captured by the same image sensor at different points in time (e.g., a few milliseconds or seconds apart from one another). Alternatively or additionally, captured images 300 and 302 may have been captured at the same time or approximately the same time, but with two different image sensors. These two image sensors may be spatially separated so that captured images 300 and 302 are captured from different angles.

Regardless, some image processing techniques may involve taking information from both captured images 300 and 302, and merging this information into synthetic image 304. For instance, information from captured images 300 and 302 can be combined into synthetic image 304 to create a sharpened or de-noised image.

Alternatively, to the extent that captured images 300 and 302 depict movement, synthetic image 304 may be an interpolation of an intermediate point of this movement. For instance, if captured images 300 and 302 are video frames of a sequence of captured video frames, synthetic image 304 may approximate an intermediate video frame of this sequence. Thus, if captured images 300 and 302 were captured 30 milliseconds apart from one another, synthetic image 304 may approximate a video frame that, hypothetically, could have been captured 15 milliseconds after captured image 300 and 15 milliseconds before captured image 302. By synthesizing one or more of such intermediate video frames, a slow motion video sequence can be created.

In another alternative, captured images 300 and 302 may have been captured by two spatially separated image sensors. In this case, synthetic image 304 may approximate an image captured by a virtual image sensor positioned at an intermediate location between the two "real" image sensors. By doing so, the scene depicted in the images may be viewed from more camera angles than were used for the actual capture of the images.

Regardless of how this sort of image synthesis is used, it is beneficial to first align captured images 300 and 302. In its simplest form, this alignment may involve shifting each pixel of one image by a certain number of pixel or sub-pixel offsets in the x and y directions, respectively. However, this simple approach usually results in a poor alignment, because different pixels may actually move by different offsets. A more robust alignment technique is to determine the x and y offsets for each pixel individually. However, for large images, such as 4, 6, 8, or 15 megapixel images, doing so may be computationally prohibitive.

Herein, a new image alignment technique is disclosed. A first image (e.g., captured image 300) is divided into non-overlapping square or rectangular tiles. The tiles are mapped to respective offsets that identify locations in a second image (e.g., captured image 302). These mappings are approximated with bivariate quadratic surfaces (i.e., two-dimensional quadratic functions), incorporating confidence levels of the mappings. However, it may be possible to use different types of functions in some situations. An information filtering technique (e.g., based on Kalman filters) may be applied to the surfaces, resulting in a per-pixel offset for each pixel in the first image, where the offsets represents the movement of the pixel between the first image and the second image.

As a result, the first image can be warped into alignment with the second image, or the second image can be warped into alignment with the first image. By merging information from the aligned images, sharpened or de-noised versions of these images may be created. Alternatively or additionally, synthetic images representing temporal-intermediate or spatially-intermediate versions of the scene may be created.

Figure 4:
FIG. 4 depicts generation of synthetic images, according to example embodiments.

As an example of synthesizing an intermediate image from two captured images, consider FIG. 4. Part (a) and part (b) of this figure show respective first and second images. Part (c) shows a synthetic image formed by averaging the pixel values of the first and second images, without per-pixel alignment. This naïve technique produces significant ghosting (objects blending into each other due to image misalignment), as the bird's head and wings are blurred. Part (d) shows another synthetic image formed by using the warping alignment embodiments described herein, as well as edge-aware filtering (described in more detail below). The outcome is an intermediate image with much less ghosting.

Example embodiments of the alignment technique are described in detail in the following sections.

3. Tile-Based Analysis

As an example, consider the problem of taking two small sub-images, each from a different captured image of a scene, and computing a "distance matrix" that measures the mismatch between the two sub-images for various offsets (translations) of the sub-images. Entries in the distance matrix indicate the relatively goodness-of-fit of the offsets of the two sub-images. The offsets that minimizes distance measure used to create the matrix is likely to be a reasonably accurate estimate of the motion that transforms the first sub-image into the second sub-image.

A. Example Determination of a Distance Matrix

In order to formally define the distance matrix, a simplified example may be helpful. The L2 distance between two vectors a and b may be calculated as:

$$d = \|a-b\|_2^2 \quad (1)$$

Where $\|x\|_2 = \sqrt{\Sigma_i |x_i|^2}$. The L2 distance may also be referred to as the L2 norm or Euclidian norm.

This distance can be rewritten as:

$$d = \|a - b\|_2^2 \quad (2)$$
$$= \sum_i (a_i - b_i)^2$$
$$= \sum_i (a_i - b_i)(a_i - b_i)$$
$$= \sum_i (a_i^2 + b_i^2 - 2a_i b_i)$$
$$= \|a\|_2^2 + \|b\|_2^2 - 2a^T b$$

Thus, the squared L2 distance between two vectors decouples into the squared L2 norm of each vector, minus twice the inner product of the two vectors.

Relating this to image alignment, a distance matrix may be generated for an n×n image tile T being mapped to a p×p image portion I, where p>n. In other words, the distance matrix may contain distances relating to respective fits between tile T and each n×n sub-image of image portion I. Note that image portion I may be a whole image, or any portion of the image that is bigger than tile T.

For purposes of simplicity, throughout the following discussion, image T and image portion I are assumed to be square. However, either or both of these could be rectangular instead. Thus, tile T could be m×n, and image portion I could be p×q. Further, the following discussion also assumes that image T and image portion I are grayscale for convenience, though the techniques described herein may be generalized to color images.

Formally, it would be desirable to generate a (p−n+1)×(p−n+1) distance matrix D, such that:

$$D(u, v) = \sum_{x=0}^{n-1} \sum_{y=0}^{n-1} (T(x, y) - I(x+u, y+v))^2 \quad (3)$$

Where T (x, y) is the value of the pixel at the (x, y) position of tile T, and I(x+u, y+v) is the value of the pixel at the (x+u, y+v) position of image portion I. This calculation can be simplified as follows:

$$D(u, v) = \sum_{x=0}^{n-1} \sum_{y=0}^{n-1} T(x, y)^2 + \quad (4)$$
$$\sum_{x=0}^{n-1} \sum_{y=0}^{n-1} I(x+u, y+v)^2 - 2 \sum_{x=0}^{n-1} \sum_{y=0}^{n-1} T(x, y) I(x+u, y+v)$$

The first term depends only on T and not at all on u or v, and so it can be computed once and re-used when computing each value of D (u, v). The second term can be computed for all values of (u, v) by box filtering I(x, y)², which can be done efficiently using sliding-window image filtering techniques or using integral images. The third term can also be computed for all values of (u, v) by cross-correlating I and T.

In general, box filtering of an image applies a linear filter to an input image such that each pixel in the filtered image has a value equal to the average value of its neighboring pixels in the input image. For instance, a 3×3 box filter can be applied to each pixel of the input image to blur, sharpen, detect edges, and perform other effects to the input image. Here, the box filter is applied to 1 squared.

Cross-correlation can be expensive to compute naively, but can be sped up significantly by using fast Fourier transforms (FFTs). From the convolution theorem:

$$a * b = \mathcal{F}^{-1} \{ \mathcal{F}\{a\} * \circ \mathcal{F}\{b\} \} \quad (5)$$

Where $\mathcal{F}$ is the Fourier transform, $\mathcal{F}^{-1}$ is the inverse Fourier transform, $\circ$ is the pointwise product of two vectors, and $\mathcal{F}\{a\}^*$ is the conjugate transpose of $\mathcal{F}\{a\}$.

Based on these observations, D can be expressed, for all offsets (u, v), as:

$$D = \|T\|_2^2 + \text{boxfilter}(I^2, n) - 2\mathcal{F}^{-1}\{\mathcal{F}\{I\}^* \circ \mathcal{F}\{T\}\} \quad (6)$$

Where the first term is the sum of the squared elements of T, the second term is the squared elements of image portion I filtered with a box filter of size n×n (where the box filter is not normalized), and the third term is based on the cross-correlation of I and T, computed efficiently using an FFT.

B. Example Quadratic Approximation of the Distance Matrix

A distance matrix D (u, v) contains a rich amount of information describing how well matched tile T and image portion I are for all possible translations. This is a powerful description, but it is also a large and somewhat unwieldy representation. For a 32×32 pixel tile T (the tile being matched) and a 64×64 image portion I (the image portion being searched for a match with tile T), there is a 33×33 distance matrix D. Given that a goal is to find the single best match between tile T and image portion I, it is desirable to produce a simplified representation of distance matrix D by fitting a simple function to distance matrix D near the location of its minimum. The minimum of distance matrix D indicates the x and y direction offsets of the best determined fit between tile T and image portion I.

In order to provide a compact representation of distance matrix D, a two-dimensional polynomial, such as a bivariate quadratic surface, can be fit at or near the entry in distance matrix D that has the minimum value of all entries in distance matrix D. If multiple minima exist, any one may be chosen. This quadratic surface may be useful in a variety of ways. Such a quadratic surface could be used to estimate the sub-pixel location of the minimum of distance matrix D, which is more accurate than simply taking the per-pixel location as the minimum for most motion-estimation tasks. Additionally, a quadratic approximation could also be used as a compact approximation to distance matrix D in a more sophisticated motion estimation algorithm, such as an optical flow algorithm. In optical flow algorithms, for example, the relative confidences of respective motion estimates are used to weigh these estimates.

To clarify, distance matrix D may be viewed as an error surface that is to be approximated by a bivariate quadratic surface, where D (u, v) is the L2 distance between the tile T and image portion I when the tile T is offset (e.g., shifted) by (u, v) in the image portion I. This approximation should accurately model the shape of distance matrix D near a minimum, and it is acceptable for the approximation to be poor far from this minimum. In most cases, distance matrix D, as a whole, is poorly modeled with a single bivariate quadratic surface. But for the purposes herein, since the goal is to have a reasonably accurate fit near the minimum, less accurate fits away from the minimum are not problematic.

More formally, distance matrix D can be approximated as follows:

$$D'(u, v) \approx \frac{1}{2}[u; v]^2 A[u; v] + b^T[u; v] + c \quad (7)$$

Where A is a 2×2 positive semi-definite matrix (PSD), b is a 2×1 vector, and c is a scalar value.

A matrix M is PSD if the expression $z^T M z$ is non-negative for every non-zero column vector z of n real numbers. A is assumed to be PSD because the shape of D' near its minimum is expected to be an upward-facing quadratic surface, rather than a saddle or a downward-facing surface.

Let $(\hat{u}, \hat{v})$ be the coordinate of a minimum entry in distance matrix D. A 3×3 area around $(\hat{u}, \hat{v})$, $D_{sub}$, can be used when fitting the bivariate quadratic surface. Thus, $$D_{sub} = \begin{bmatrix} D(\hat{u}-1, \hat{v}-1) & D(\hat{u}, \hat{v}-1) & D(\hat{u}+1, \hat{v}-1) \\ D(\hat{u}-1, \hat{v}) & D(\hat{u}, \hat{v}) & D(\hat{u}+1, \hat{v}) \\ D(\hat{u}-1, \hat{v}+1) & D(\hat{u}, \hat{v}+1) & D(\hat{u}+1, \hat{v}+1) \end{bmatrix} \quad (8)$$

Each pixel in $D_{sub}$ can be weighted according to a 3×3 set of binomial weights:

$$W = \begin{bmatrix} 1 & 2 & 1 \\ 2 & 4 & 2 \\ 1 & 2 & 1 \end{bmatrix} \quad (9)$$

With $D_{sub}$ and W, a least-squares problem can be set up with respect to the free parameters in the quadratic approximation (A, b, c). Solving such a linear system is computationally expensive to do in practice, but a closed-form solution can be derived for any arbitrary 3×3 error surface with the weighting W. This solution is expressible in terms of six 3×3 filters:

$$f_{A_{1,1}} = \begin{bmatrix} 1 & -2 & 1 \\ 4 & -8 & 4 \\ 1 & -2 & 1 \end{bmatrix} / 6 \quad (10)$$

$$f_{A_{1,2}} = \begin{bmatrix} 1 & 0 & -1 \\ 0 & 0 & 0 \\ -1 & 0 & 1 \end{bmatrix} / 4 \quad (11)$$

$$f_{A_{2,2}} = \begin{bmatrix} 1 & 4 & 1 \\ -2 & -8 & -2 \\ 1 & 4 & 1 \end{bmatrix} / 6 \quad (12)$$

$$f_{b_1} = \begin{bmatrix} -1 & 0 & 1 \\ -4 & 0 & 4 \\ -1 & 0 & 1 \end{bmatrix} / 6 \quad (13)$$

$$f_{b_2} = \begin{bmatrix} -1 & -4 & -1 \\ 0 & 0 & 0 \\ 1 & 4 & 1 \end{bmatrix} / 6 \quad (14)$$

$$f_c = \begin{bmatrix} -1 & 2 & -1 \\ 2 & 32 & 2 \\ -1 & 2 & -1 \end{bmatrix} / 36 \quad (15)$$

The free parameters of the quadratic approximation can be found by taking the inner product of $D_{sub}$ with these filters (assuming the error surface and the filter have been vectorized), or equivalently by computing the cross-correlation of $D_{sub}$ with these filters:

$$A = \begin{bmatrix} f_{A_{1,1}} \cdot D_{sub} & f_{A_{1,2}} \cdot D_{sub} \\ f_{A_{1,2}} \cdot D_{sub} & f_{A_{2,2}} \cdot D_{sub} \end{bmatrix} \quad (16)$$

$$b = \begin{bmatrix} f_{b_1} \cdot D_{sub} \\ f_{b_2} \cdot D_{sub} \end{bmatrix} \quad (17)$$

$$c = f_c \cdot D_{sub} \quad (18)$$

Due to image filtering being a linear operation, the bivariate quadratic surface can be fit to a larger area of distance matrix D than a 3×3 section. For instance, it is sufficient to pre-filter distance matrix D with a blur, and then perform the 3×3 operation above on the blurred error surface.

In some cases, depending on the shape of $D_{sub}$, the estimated A might not be positive semi-definite, contrary to the assumption above. To address this issue, the diagonal elements of A can be set as non-negative:

$$A_{1,1} = \max(0, A_{1,1}) \quad (19)$$

$$A_{2,2} = \max(0, A_{2,2}) \quad (20)$$

The determinant of A can be calculated as:

$$\det(A) = A_{1,1} A_{2,2} - A_{1,2}^2 \quad (21)$$

If det(A)<0, then the off-diagonal elements of A can be set to be zero. These operations result in an A that is guaranteed to be positive semi-definite.

With this in place, the minimum of the bivariate quadratic surface fit to distance matrix D can be found. To do so, the surface can be rewritten in a different form:

$$\frac{1}{2} x^T A x + b^T x + c = \frac{1}{2}(x-\mu)^T A(x-\mu) + s \quad (22)$$

Where $$\mu = -A^{-1} b \quad (23)$$

$$s = c - \frac{\mu^T A \mu}{2} \quad (24)$$

For a bivariate quadratic surface, this is equivalent to:

$$\mu = \frac{[A_{2,2} b_1 - A_{1,2} b_2, A_{1,1} b_2 - A_{1,2} b_1]^T}{A_{1,1} A_{2,2} - A_{1,2}^2} \quad (25)$$

$$s = c - \frac{A_{1,1} \mu_1^2 + 2 A_{1,2} \mu_1 \mu_2 + A_{2,2} \mu_2^2}{2} \quad (26)$$

These expressions can also be solved for b and c:

$$b = -A\mu = -[A_{1,1}\mu_1 + A_{1,2}\mu_2, A_{1,2}\mu_1 - A_{2,2}\mu_2]^T \quad (27)$$

$$c = s + \frac{\mu^T A \mu}{2} = s + \frac{A_{1,1}\mu_1^2 + 2A_{1,2}\mu_1\mu_2 + A_{2,2}\mu_2^2}{2} \quad (28)$$

Once the location of the minimum of the bivariate quadratic surface is determined, that is used as the sub-pixel location of the minimum of distance matrix D. Note that the fitted bivariate quadratic surface treats the center pixel of $D_{sub}$ as (0,0). So, after fitting, the per-pixel minimum location $(\hat{u}, \hat{v})$ is added into $\mu$, which provides the actual location of the minimum in minimum of distance matrix D. In the presence of severe noise or flat images with little texture, it is possible for the predicted sub-pixel minimum $\mu$ to be different from the observed per-pixel minimum $(\hat{u}, \hat{v})$. If these two values are sufficiently different (e.g., more than 1 pixel removed), $\mu$ is set to $[\hat{u}; \hat{v}]$.

C. Example Distance Matrixes and Quadratic Approximations of Real Images

Figure 5:
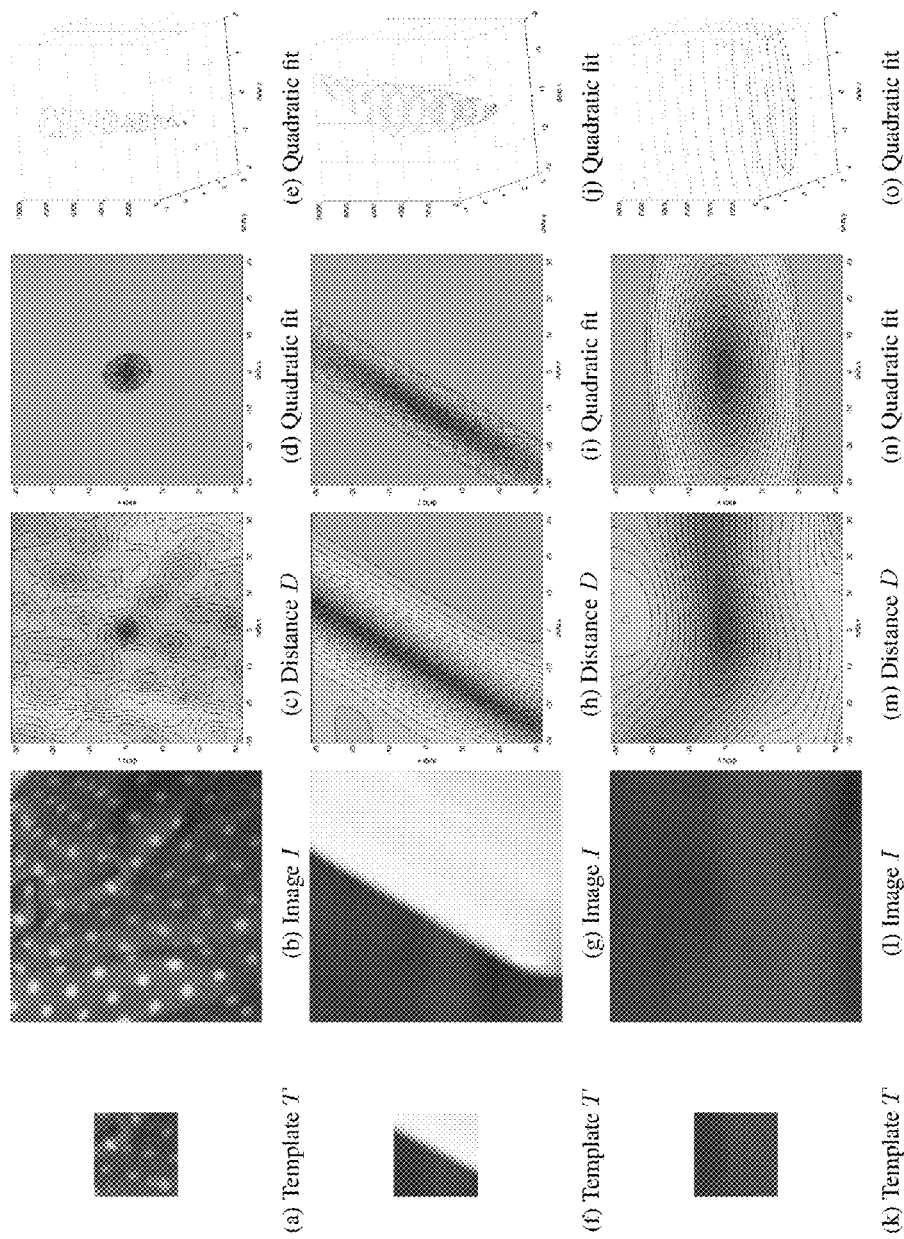
FIG. 5 depicts estimating locations of a tile in a larger image portion, according to example embodiments.

FIG. 5 depicts the determination of distance matrixes and their associated quadratic approximations for three example tiles being matched to three example image portions.

The first column of FIG. 5 shows the three tiles, and the second column shows respective image portions. Each image portion may be searched for one or more matches of its associated tile. The third column shows the distance matrix D for each tile, calculated using Equation (6). The fourth column shows the bivariate quadratic fit to that distance matrix, around the minimum point of the distance matrix, and clipped to the maximum value of the distance matrix. The fifth column shows 3D visualizations of the fitted bivariate quadratic.

In addition to representing a fit between a tile and its associated image portion, each bivariate quadratic surface fits also represent confidence measures of the fit. Where the surface has a small value on the z-axis (the vertical axis), the confidence of the fit is higher, and where the surface has a larger value on the z-axis, the confidence of the fit is lower.

From FIG. 5, it can be noted that for tiles that are highly textured and distinctive, such as the one in the first row, the distance matrix has a very clear minimum value and the bivariate quadratic fit is curved and well-localized as a result. In the second row, the tile depicts only an edge in the image, the distance matrix has many possible minimum values oriented alongside that edge, and the bivariate quadratic is therefore confident in one axis, but ambiguous in the perpendicular axis. In the third row, where the tile and the image portion is un-textured and mostly flat, the minimum is poorly-localized, as shown by the low curvature of the bivariate quadratic in all directions.

D. Example Information Filtering

In the previous sections, estimating a bivariate quadratic surface for each tile in an image was demonstrated. The bivariate quadratic surface describes the local shape of an error surface, and assumes that the minimum of each error surface was a good estimate of the displacement vector (the offset between pixels) across the two images being matched. These operations provide a per-tile estimate of motion, but do not provide a per-pixel estimate of motion, which is desirable for many applications. This section introduces a technique for applying a linear filter (such as an image upsampling operation or an edge-aware filtering operation) to a set of bivariate quadratic surfaces. In doing so, estimates of per-pixel motion can be obtained.

In order to simplify calculations, it is assumed that each bivariate quadratic surface actually describes the negative log-likelihood of a multivariate normal distribution. A multivariate normal distribution may be parameterized by a vector of means $\mu$ and a covariance matrix $\Sigma$:

$$P(x|\mu, \Sigma) = \frac{\exp\left(-\frac{1}{2}(x-\mu)^T \Sigma^{-1}(x-\mu)\right)}{\sqrt{(2\pi)^k |\Sigma|}} \quad (29)$$

Thus, a set of multivariate normal distributions (i.e., the bivariate quadratic surfaces for each tile in the first image), can be parameterized by means $\{\mu^{(i)}\}$ and covariance matrixes $\{\Sigma^{(i)}\}$. A weighted geometric mean (according to a vector of weights w) of these normal distributions can be taken to get a weighted "average" distribution parametrized by means $\bar{\mu}$ and a covariance matrix $\bar{\Sigma}$:

$$P(x|\bar{\mu},\bar{\Sigma}) \propto \exp(w_i \log(P(x|\mu^{(i)},\Sigma^{(i)}))) \quad (30)$$

Where $\propto$ is the proportionality symbol (e.g., $y \propto z$ means that $y=kz$ for some k). Further:

$$\bar{\Sigma} = (\Sigma_i w_i (\Sigma^{(i)})^{-1})^{-1} \quad (31)$$

$$\bar{\mu} = \bar{\Sigma} \Sigma_i w_i (\Sigma^{(i)})^{-1} \mu^{(i)} \quad (32)$$

Equation (30) is an awkward expression and difficult to manipulate, but can be simplified by re-writing it as an exponentiated polynomial:

$$P(x | A, b) = \exp\left(-\left(\frac{1}{2} x^T A x + b^T x + c\right)\right) \quad (33)$$

Where $$A = \Sigma^{-1} \quad (34)$$

$$b = -A\mu \quad (35)$$

$$c = \frac{1}{2}(k\log 2\pi - \log|A| + b^T A^{-1} b) \quad (36)$$

Rewritten as such, this format has the convenient consequence of dramatically simplifying the process of taking a weighted geometric mean of a set of n distributions $\{A^{(i)}, b^{(i)}\}$:

$$P(x|\bar{A},\bar{b}) \propto \exp(w_i \log(P(x|A^{(i)},b^{(i)}))) \quad (37)$$

Where:

$$\bar{A} = \Sigma_i w_i A^{(i)} \quad (38)$$

$$\bar{b} = \Sigma_i w_i b^{(i)} \quad (39)$$

The averaged multivariate normal distribution in standard form is the average of the standard-form coefficients of the input distributions. Or put another way, the output parameters are simply a weighted sum of the input parameters. This result is based on the geometric mean of a set of distributions being the average of those distributions in log-space, and that in log-space the distributions are polynomials.

With this insight, a compact vectorised representation of the multivariate normal distributions can be expressed as:

$$x^{(i)} = \begin{bmatrix} b^{(i)} \\ triu(A^{(i)}) \end{bmatrix} \quad (40)$$

Where triu(A) is an operation that returns a k(k+1)/2 dimensional vector containing the upper-triangular part of symmetric matrix A. Similarly, $A=triu^{-1}(\cdot)$ is an operation that takes such a vector and returns a k×k symmetric matrix A. With this vectorized representation of the multivariate normal distributions, the weighted geometric mean of normal distributions can be expressed as:

$$y = \Sigma_i w_i x^{(i)} \quad (41)$$

$$\bar{A} = triu^{-1}(y[(k+1):end]) \quad (42)$$

$$\bar{\mu} = -\bar{A}^{-1} y[1:k] \quad (43)$$

Assuming for the moment that, in addition to a set of n multivariate normal distributions as input $\{x^{(i)}\}$, it is desirable to determine a set of p multivariate normal distributions as output $\{y^{(j)}\}$, and for each output distribution there is a different set of weights $\{w^{(j)}\}$. Then:

$$y^{(j)} = \Sigma_i w_i^{(j)} x^{(i)} \quad (44)$$

This expression can be rewritten as a matrix-matrix product:

$$X = [x^{(1)}, x^{(2)}, x^{(3)}, \ldots, x^{(n)}]^T$$

$$W = [w^{(1)}, w^{(2)}, w^{(3)}, \ldots, w^{(p)}]^T$$

$$Y = [y^{(1)}, y^{(2)}, y^{(3)}, \ldots, y^{(p)}]^T$$

$$Y = WX \quad (45)$$

This results in a filtering approach that is similar to that of a Kalman information filter.

With this matrix formulation of the problem, this process can be re-interpreted in terms of image filtering. Assume that for an image of multivariate normal distributions, each pixel has a mean and a covariance matrix. Based on a linear filtering operation, the set of input normal distributions can be averaged to get a filtered set of output normal distributions. This can be done by constructing an image with $(k^2+3k)/2$ channels using the vectorization operation in Equation (40), which is equivalent to the X matrix in Equation (45). Each channel can be filtered (equivalent to taking the matrix-matrix product WX) to get the output filters. The vectorization operation can be unpacked as described earlier to get the set of per-pixel output multivariate normal distributions.

There is no restriction on W, and W need not be an actual matrix, but can instead by any linear operation (that is, any linear filter or resampling operation). W may be row-stochastic, so that each output normal distribution is a convex combination of the input normal distributions. But, due to the normalization involved in the filter, the value of the output mean of each normal distribution $\bar{\mu}$ is invariant to the scale of the each row of W. So, though W may be row-normalized to produce meaningful precisions, it does not need to be row-normalized to produce accurate output values.

Estimating 2D motion on an image plane is an example of the two-dimensional (k=2) case. Thus, a five-dimensional image can be constructed, in which the first two dimensions are the elements of $b^{(i)}$, and the last three dimensions are the three unique values in the precision matrix $triu(A^{(i)})$, as shown in Equation (40). After filtering this five-dimensional image, each pixel's estimated motion $\mu^{(i)}$ can be extracted using the transformation described in Equation (43) on each pixel's five values.

Each dimension loosely corresponds to one the five free parameters of a two-dimensional normal distribution: mean in x, mean in y, variance in x, covariance of x and y, and variance in y. Using Equations (34) and (35), these five quantities are reworked so that they roughly correspond to: precision in x (where precision is the inverse of variance), precision in y, precision in xy, the mean in x decorrelated by the precision matrix, and the mean in y decorrelated by the precision matrix. In some cases, the three precision quantities are the elements of the precision matrix of the normal distribution.

4. Example Applications

This section provides two example applications, image burst de-noising and edge-aware optical flow, for the techniques disclosed herein. However, other applications may exist that could benefit from these techniques.

A. Image Burst De-Noising

The techniques described herein for matching tiles to image portions can be used as a way of matching image patches across a burst of images for the purpose of de-noising one or more images in the burst. Images captured by some sensors, such as those found on cell phones, tend to produce high amounts of noise, creating unattractive artifacts when the images are viewed at high resolutions. To lower the amount of noise, one could attempt to take a burst of images from the camera and combine (e.g., average) those images together. However, this approach does not always work well on some scenes, as the motion of the camera and of the subjects in the scene means that naively combining frames will cause ghosting. Therefore, the images in the burst should be aligned against a single image from the burst, and then those aligned images can be combined.

Given a burst, a single image is selected from the burst to use as a "template" image. For each m×n (e.g., 32×32) tile in the template image, the previously-described matching procedure is used to align that tile against the corresponding p×q (e.g., 64×64) image region in the other images in the burst. The per-tile bivariate quadratic fits are upsampled with the previously described information filtering technique, where bicubic interpolation is used with each tile's bivariate quadratic surface, and from which the mean offset for each pixel can be extracted (see Equation (45)). Given this estimated per-pixel offset, the other images can be warped into the "template" image, and then the warped images can be combined to create a de-noised image.

Figure 6:
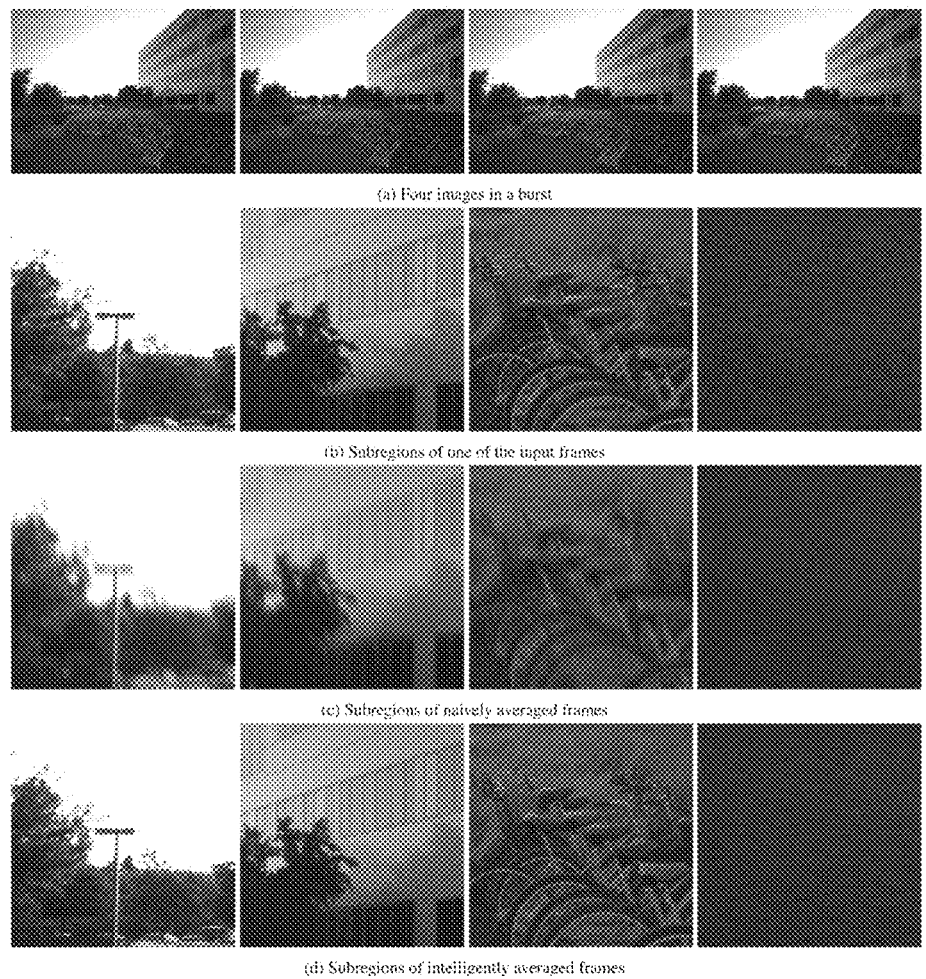
FIG. 6 depicts generation of synthetic images, according to example embodiments.

For an example of image burst de-noising, see FIG. 6. The first row is a four-frame burst of a scene, in which the camera and the subjects are moving. The second row contains sub-regions of one of the images from the burst, which shows that there is noise in the images. The third row contains the same sub-regions, where naïve combining of the pixel values in the burst has been applied. Though this does reduce noise, but it also causes substantial ghosting due to the motion of the objects. For the fourth row, each image in the burst has been warped into a "template" image, and then the warped images have been combined. These images have low noise and no ghosting.

B. Edge-Aware Optical Flow

Another application is optical flow. Given two images, a flow vector may be assigned to each pixel, where the flow vector represents movement of the pixel from one image to the other. Doing so for some images can be challenging because of the aperture problem. Motion is difficult to locally estimate from two images, because observing the motion of an edge only constrains the motion vector to a one-dimensional subspace of possible flow vectors. To correctly estimate global motion from local motion estimates, the information provided by image edges can be combined, together with the uncertainty inherent in such information, and propagated across an image to resolve flow ambiguities.

Note that for some image patches the aperture problem does not hold. For flat image patches, the motion is entirely unconstrained, and should be modeled accordingly. For highly texture images patches the motion may be entirely constrained in both dimensions. Note that the three types of patches—flat, edge, and texture—are all the same phenomenon viewed at different scales. An image patch containing a small square may be thought of as texture, while a patch containing the inside of a large square may be flat, and a patch of a medium-sized square will likely contain just one edge.

The information filtering technique described above may be used as the backbone of an optical flow algorithm. For every tile in one image, a bivariate normal distribution modeling the well-matched locations in the other image is estimated. Then the flow-field is upsampled to produce a per-pixel flow field, as previously described. An edge-aware filter may be applied, using the same information filtering approach. One filter that can be used is the recursive formulation of a domain transform (though it could be any linear filter). A domain transform is well-suited because it is an edge-aware filter—it propagates information along edges but not across edges. This produces pleasant looking flow fields in which the output flow closely tracks edges in the input image. Such edge-aware flow fields are useful for tracking and segmenting objects, for video retiming, and so on. The edge-aware nature of this filter naturally complements the difficulties of motion estimation. For example, in flat regions of the image where local motion cues are weakest, the domain transform will "in-paint" those regions with the information gained from observing the edges that surround that flat region. See FIG. 4 for an example of this technique in practice.

5. Example Operations

Figure 7:
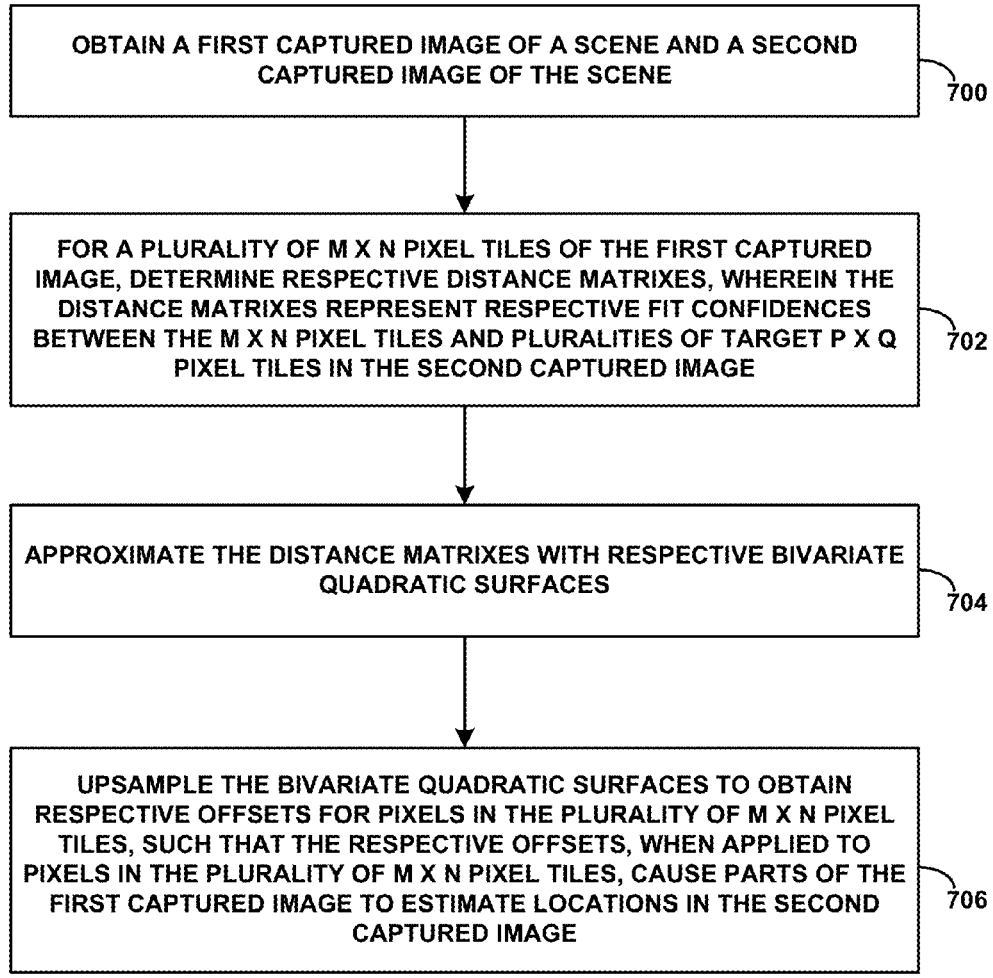
FIG. 7 is a flow chart, according to example embodiments.
Figure 8:
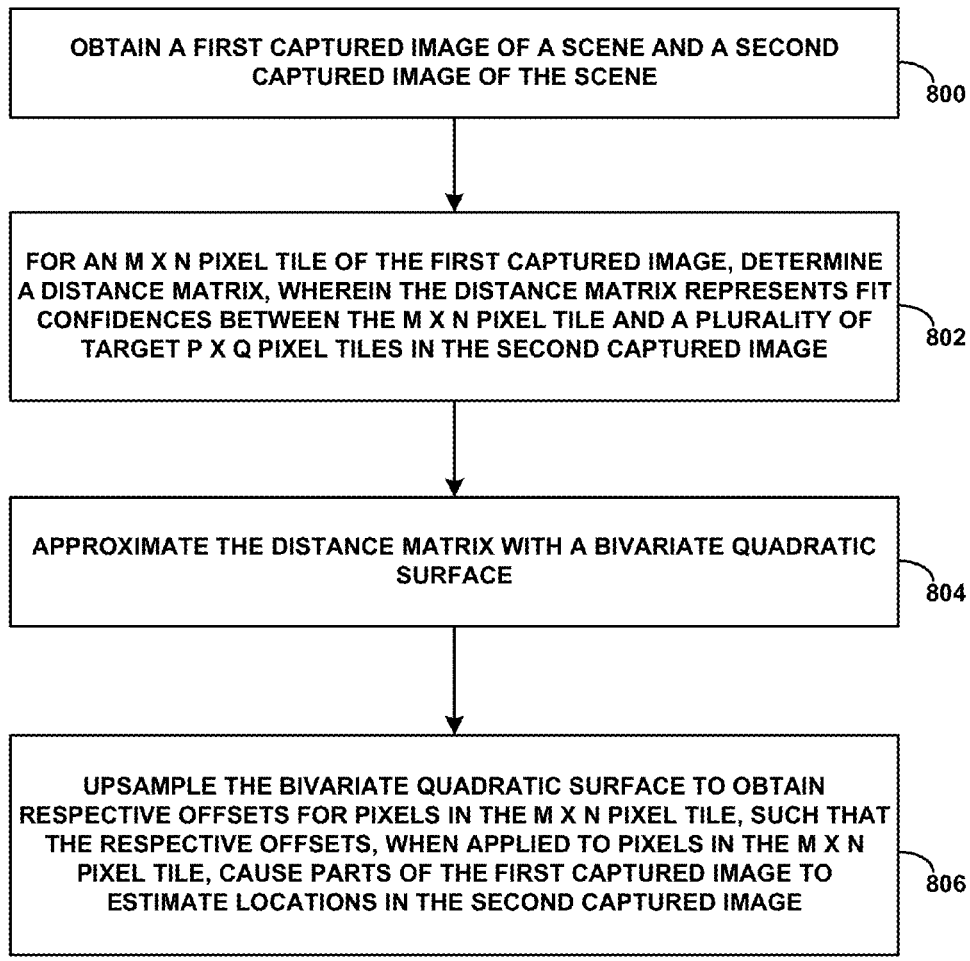
FIG. 8 is another flow chart, according to example embodiments.

FIGS. 7 and 8 are flow charts illustrating example embodiments. The embodiments illustrated by FIGS. 7 and 8 may be carried out by a computing device, such as digital camera device 100. However, the embodiments can be carried out by other types of devices or device subsystems. Further, the embodiments may be combined with one another and may incorporate any aspect or feature disclosed in this specification or the accompanying drawings.

Block 700 of FIG. 7 may involve obtaining a first captured image of a scene and a second captured image of the scene. Block 702 may involve, for a plurality of m×n pixel tiles of the first captured image, determining respective distance matrixes. The distance matrixes may represent respective fit confidences between the m×n pixel tiles and pluralities of target p×q pixel tiles in the second captured image (e.g., image portions of the second captured image).

In some embodiments, the m×n pixel tiles do not overlap with one another. Further, as an example, the m×n pixel tiles may be 32×32 pixel tiles and the p×q pixel tiles may be 64×64 pixel tiles. Thus, in some cases, m=n and p=q.

Block 704 may involve approximating the distance matrixes with respective bivariate quadratic surfaces. Block 706 may involve upsampling the bivariate quadratic surfaces to obtain respective offsets for pixels in the plurality of m×n pixel tiles, such that the respective offsets, when applied to pixels in the plurality of m×n pixel tiles, cause parts of the first captured image to estimate locations in the second captured image. Upsampling the bivariate quadratic surfaces may involve applying a Kalman filter.

In some embodiments, upsampling the bivariate quadratic surfaces uses bicubic interpolation of respective 3×3 tile regions in the first captured image that surround each respective m×n pixel tile. In these embodiments, one of the first captured image or the second captured image may be selected for warping. Based on the respective offsets, pixels of the selected image may be moved to create a warped image. Then, respective pixel values of the warped image and the non-selected image may be combined to form a de-noised image.

In some embodiments, upsampling the bivariate quadratic surfaces uses an edge-aware filter on respective tile regions in the first captured image that surround each respective m×n pixel tile, and are defined by one or more edges in the first captured image. In these embodiments, an intermediate image that represents intermediate locations of pixels may be interpolated. These pixels may be from the first captured image and the second captured image, and may represent an intermediate version of the scene that is temporally or physically between those of the first captured image and the second captured image. The interpolation may be based on the first captured image, the second captured image, and the respective offsets.

In some embodiments, the first captured image and the second captured image may have been captured less than 1 second apart. Alternatively or additionally, obtaining the first captured image of the scene and the second captured image of the scene may involve capturing, by the computing device, the first captured image and the second captured image.

In some embodiments, one or more entries in each distance matrix are respective minima, and approximating the distance matrixes with respective bivariate quadratic surfaces may involve fitting minima of the respective bivariate quadratic surfaces to the respective minima of the distance matrixes. Fitting minima of the respective bivariate quadratic surfaces to the respective minima of the distance matrixes may involve fitting the respective bivariate quadratic surfaces to respective binomially-weighted 3×3 pixel regions surrounding the respective minima of the distance matrixes.

In some embodiments, a particular distance matrix for a particular m×n pixel tile may be based on a linear combination of (i) a sum of squared values in the particular m×n pixel tile, (ii) squared values in the second captured image filtered by a box filter, and (iii) a cross-correlation of the second captured image and the particular m×n pixel tile.

FIG. 8 is a flow chart of another example embodiment. This embodiment is similar to that of FIG. 7, except that it is directed to alignment of a single tile.

Block 800 of FIG. 8 may involve obtaining a first captured image of a scene and a second captured image of the scene. Block 802 may involve, for an m×n pixel tile of the first captured image, determining a distance matrix. The distance matrix may represent fit confidences between the m×n pixel tile and a plurality of target p×q pixel tiles in the second captured image.

Block 804 may involve approximating the distance matrix with a bivariate quadratic surface. Block 806 may involve upsampling the bivariate quadratic surface to obtain respective offsets for pixels in the m×n pixel tile. The upsampling may take place such that the respective offsets, when applied to pixels in the m×n pixel tile, cause parts of the first captured image to estimate locations in the second captured image.

Additionally, embodiments related to FIG. 8 may include one or more of the features disclosed in the context of FIG. 7, or any other figure.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    capturing, by an image sensor of a camera device, a first captured image of a scene and a second captured image of the scene;
    for a plurality of m×n pixel tiles of the first captured image, determining, by a processor of the camera device, respective distance matrixes, wherein the distance matrixes represent respective fit confidences between the m×n pixel tiles and pluralities of target p×q pixel tiles in the second captured image;
    approximating, by the processor, the distance matrixes with respective bivariate surfaces;
    upsampling, by the processor, the bivariate surfaces to obtain respective offsets for pixels in the plurality of m×n pixel tiles, such that the respective offsets, when applied to pixels in the plurality of m×n pixel tiles, cause parts of the first captured image to estimate locations in the second captured image; and
    based on the first captured image, the second captured image, and the respective offsets, generating, by the processor, an intermediate image with intermediate locations of the pixels from the first captured image and the second captured image, wherein the intermediate image represents an intermediate version of the scene that is temporally or physically between those of the first captured image and the second captured image.

2. The method of claim 1, wherein upsampling the bivariate surfaces uses bicubic interpolation of respective 3×3 tile regions in the first captured image that surround each respective m×n pixel tile.

3. The method of claim 1, wherein upsampling the bivariate surfaces uses an edge-aware filter on respective tile regions in the first captured image that surround each respective m×n pixel tile and are defined by one or more edges in the first captured image.

4. The method of claim 1, wherein upsampling the bivariate surfaces uses a Kalman filter.

5. The method of claim 1, wherein the first captured image and the second captured image were captured less than 1 second apart.

6. The method of claim 1, wherein the m×n pixel tiles do not overlap with one another.

7. The method of claim 1, wherein one or more entries in each distance matrix are respective minima, and wherein approximating the distance matrixes with respective bivariate surfaces comprises fitting minima of the respective bivariate surfaces to the respective minima of the distance matrixes.

8. The method of claim 7, wherein fitting minima of the respective bivariate surfaces to the respective minima of the distance matrixes comprises fitting the respective bivariate surfaces to respective binomially-weighted 3×3 pixel regions surrounding the respective minima of the distance matrixes.

9. The method of claim 1, wherein the m×n pixel tiles are 32×32 pixel tiles and the p×q pixel tiles are 64×64 pixel tiles.

10. The method of claim 1, wherein a particular distance matrix for a particular m×n pixel tile is based on a linear combination of (i) a sum of squared values in the particular m×n pixel tile, (ii) squared values in the second captured image filtered by a box filter, and (iii) a cross-correlation of the second captured image and the particular m×n pixel tile.

11. The method of claim 1 wherein the bivariate surfaces are bivariate quadratic surfaces.

12. A camera device comprising:
    an image sensor;
    a processor;
    memory; and
    program instructions, stored in the memory, that upon execution cause the camera device to perform operations comprising:
        capturing, by the image sensor, a first captured image of a scene and a second captured image of the scene;
        for a plurality of m×n pixel tiles of the first captured image, determining, by the processor, respective distance matrixes, wherein the distance matrixes represent respective fit confidences between the m×n pixel tiles and pluralities of target p×q pixel tiles in the second captured image;
        approximating, by the processor, the distance matrixes with respective bivariate surfaces;
        upsampling, by the processor, the bivariate surfaces to obtain respective offsets for pixels in the plurality of m×n pixel tiles, such that the respective offsets, when applied to pixels in the plurality of m×n pixel tiles, cause parts of the first captured image to estimate locations in the second captured image; and
        based on the first captured image, the second captured image, and the respective offsets, generating, by the processor, an intermediate image with intermediate locations of the pixels from the first captured image and the second captured image, wherein the intermediate image represents an intermediate version of the scene that is temporally or physically between those of the first captured image and the second captured image.

13. The camera device of claim 12, wherein upsampling the bivariate surfaces uses bicubic interpolation of respective 3×3 tile regions in the first captured image that surround each respective m×n pixel tile.

14. The camera device of claim 12, wherein upsampling the bivariate surfaces uses an edge-aware filter on respective tile regions in the first captured image that surround each respective m×n pixel tile and are defined by one or more edges in the first captured image.

15. The camera device of claim 12, wherein the first captured image and the second captured image were captured less than 1 second apart.

16. The camera device of claim 12, wherein one or more entries in each distance matrix are respective minima, and wherein approximating the distance matrixes with respective bivariate surfaces comprises fitting minima of the respective bivariate surfaces to the respective minima of the distance matrixes.

17. The camera device of claim 16, wherein fitting minima of the respective bivariate surfaces to the respective minima of the distance matrixes comprises fitting the respective bivariate surfaces to respective binomially-weighted 3×3 pixel regions surrounding the respective minima of the distance matrixes.

18. The camera device of claim 12, wherein a particular distance matrix for a particular m×n pixel tile is based on a linear combination of (i) a sum of squared values in the particular m×n pixel tile, (ii) squared values in the second captured image filtered by a box filter, and (iii) a cross-correlation of the second captured image and the particular m×n pixel tile.

19. A method comprising:
  capturing, by an image sensor of a camera device, a first captured image of a scene and a second captured image of the scene;
  for an m×n pixel tile of the first captured image, determining, by a processor of the camera device, a distance matrix, wherein the distance matrix represents fit confidences between the m×n pixel tile and a plurality of target p×q pixel tiles in the second captured image;
  approximating, by the processor, the distance matrix with a bivariate surface;
  upsampling, by the processor, the bivariate surface to obtain respective offsets for pixels in the m×n pixel tile, such that the respective offsets, when applied to pixels in the m×n pixel tile, cause parts of the first captured image to estimate locations in the second captured image; and
  based on the first captured image, the second captured image, and the respective offsets, generating, by the processor, an intermediate image that with intermediate locations of the pixels from the first captured image and the second captured image, wherein the intermediate image represents an intermediate version of the scene that is temporally or physically between those of the first captured image and the second captured image.

20. The method of claim 19, wherein one or more entries in each distance matrix are respective minima, and wherein approximating the distance matrixes with respective bivariate surfaces comprises fitting minima of the respective bivariate surfaces to the respective minima of the distance matrixes.

* * * * *